2,893,969
Patented July 7, 1959

2,893,969

COMPOSITION CONTAINING DIISOCYANATE-MODIFIED POLYESTER, POLYMERIZED VINYL HALIDE, FILLER AND AROMATIC DIISOCYANATE

Galen E. Graham, East Hempfield Township, Lancaster County, and John A. Parker, Lancaster Township, Lancaster County, Pa., assignors to Armstrong Cork Company, Lancaster, Pa., a corporation of Pennsylvania No Drawing. Application January 13, 1956
Serial No. 558,834

9 Claims. (Cl. 260—45.4)

This invention relates generally to novel compositions of matter, and more particularly to surface covering materials. Still more particularly it relates to surface covering materials comprising a binder system, filler, and a delayed action organic diisocyanate having specific properties.

It is the primary object of the present invention to present a novel curable composition of matter having a substantially increased rate of cure. It is a further object to present a surface covering composition which can be sulfur cured at elevated temperatures at a rate such that stove staining is materially reduced. It is a still further object to present a cured surface covering composition having advantageous properties.

To this end, the invention contemplates a composition comprising in general three ingredients. The first ingredient may be termed the binder system and comprises about 30%–75% by weight diisocyanate-modified polyester and about 70%–25% by weight polymerized vinyl halide. The second ingredient comprises filler. The relative amounts of the binder system and the filler should be about 85%–25% by weight binder system and 15%–75% by weight filler. The third ingredient comprises an aromatic diisocyanate having an alkyl group ortho to each isocyanate group. This aromatic diisocyanate must be present in an amount of about 0.38 to about 4 parts by weight per each 100 parts by weight of the binder system. The diisocyanate-modified polyester in the binder system is the reaction product of just sufficient organic diisocyanate with unmodified polyester to form a gel. The unmodified polyester must have an acid number in the range of about 2–15, preferably about 4–6, and a hydroxyl number in the range of about 20–55, preferably about 30–40, and is formed from a saturated glycol having 4–6 carbon atoms, a saturated dibasic acid having 6–10 carbon atoms, and a dibasic acid possessing a single unsaturated bond and having no more than 8 carbon atoms. The saturated acid and the unsaturated acid are present in the polyester in a mole ratio of about 2:1.

The polyester utilized in the present invention is one having narrow and critical properties; this is true in view of the extremely restricted properties demanded in surface covering applications. The polyester may be prepared in unmodified form only from three classes of ingredients. The first ingredient must be a 4-carbon saturated glycol, as for example 1,3-butylene glycol, 1,4-butylene glycol, diethylene glycol, and the like. The second ingredient must be a saturated dibasic acid having a carbon chain of 6–10 carbon atoms, as for example adipic, sebacic, azaleic, methyl adipic acid, and the like. The third ingredient is a dibasic acid or anhydride possessing a single unsaturated bond and having no more than 8 carbon atoms, as for example tetrahydrophthalic, maleic, fumaric, and similar acids and anhydrides. The ratio of saturated dibasic acid to the unsaturated dibasic acid must be about 2:1 on a mole basis. Generally, the total hydroxyl equivalent in the glycol will equal the total carboxylic acid equivalents in the two acids, except for the fact that it is customary and sometimes essential to use an excess of glycol in the making of polyesters.

The properties of the present polyester are so sensitive to the ingredients used that differences appear even when the ingredients falling within the scope of the present invention are varied. For example, where 1,4-butanediol and adipic acid are used, the resulting properties are excellent. On the other hand, where 1,3-butanediol and adipic acid are used, the properties in the final modified polyester, while good, leave something to be desired. Yet where 1,3-butanediol and sebacic acid are used, the properties in the final polyester again are unusually excellent. Where 1,4-butanediol is used with either sebacic or azaleic acid, the final properties are good, yet not as good as the two formulations described as having excellent properties. In each case, of course, the ratio of the saturated acid to the ethylenically unsaturated acid remains about 2:1. Thus, it can be seen that the properties of the final polyisocyanate-modified polyester are in the present case peculiarly dependent on the precise formulation used.

The preparation of the polyester may be carried out along the lines of known polyester technics. Preferably, the glycol may be caused to react with the unsaturated acid at a temperature of about 90° C. Since the unsaturated acid may sublime very readily at higher temperatures, the mixture of glycol and unsaturated acid may be heated until the half ester of the unsaturated acid is formed. The end of the formation of the half ester can readily be seen by the disappearance of the white solid unsaturated acid from the solution, causing the solution to become homogeneous. Maleic anhydride reacts the fastest and usually requires about 5–10 minutes for the formation of the half ester. Tetrahydrophthalic anhydride and endomethylene tetrahydrophthalic anhydride react more slowly because they are less soluble in the glycol.

Once the half ester is formed, the unsaturated acid is more stable at elevated temperatures. Subsequent to the formation of the half ester of the unsaturated acid, the saturated dibasic acid may be added and the temperature of the mixture may be increased to about 145° C.

During the addition of the unsaturated and saturated acid, an inert gas flow should be maintained through the solution to minimize side reactions that might occur in the presence of air. Most of the unsaturated acids used are sensitive to oxygen and the double bond oxidizes readily. This oxidation of the double bond might lead to cross-linking of chains and subsequent formation of a gel, an undesirable reaction at this point. The ease with which the oxidation occurs is dependent upon the unsaturated acid used. The ester containing maleic anhydride and endomethylene tetrahydrophthalic anhydride oxidizes more easily than one containing tetrahydrophthalic anhydride.

After holding the temperature at 145° C. for a suitable period of time, for example about one hour, the temperature may be increased slowly, for example to about 200° C. The time required for this increase of temperature is dependent upon the boiling point of the glycol used. If the boiling point of the glycol is below about 210° C., the time required would be on the order of 2–3 hours, while boiling points above about 210° C. allow a reduction of time to about 1 to about 1½ hours.

The temperature should be held at about 200° C. until an acid number of about 30 is obtained. If the glycol boils above about 210° C., the temperature may then be increased from 200° C. to about 220° C.; but for those boiling below about 210° C., the temperature should be maintained at about 200° C. In any case, these temperatures should be maintained at their respective levels until the final end point is reached. In the latter stages of polymerization, where the acid number is below about 30 and the hydroxyl number is to be lowered further, the rate of decrease of the hydroxyl number may be dependent upon the rate of flow of carbon dioxide or other inert gas and upon the temperature of the polymer. In order to obtain a rapid decrease of the hydroxyl number in the later stages of polymerization, the temperature of the polyester should be above the boiling point of the glycol used and the gas flow increased to such a rate that the volatile glycol is swept from the reaction mixture. For the polyesters to be suitable for use in the present invention, it is necessary to obtain an acid number in the final product in the range of about 2–15 and a hydroxyl number in the range of about 20–55. A preferred embodiment calls for an acid number in the range of about $5 \pm 1$ and a hydroxyl number of $35 \pm 5$. With these latter limits on acid numbers and hydroxyl numbers, the molecular weight will generally vary from about 3400 to about 2380.

The chain length of the molecules of the above-described polyesters should then be extended by means of organic diisocyanates. The diisocyanates are organic compounds whose sole reactive groups are at least 2 isocyanate groups. Although the particular diisocyanate to be used is not critical, such considerations as handling hazards, cost, and ease of dispersion make 2,4-toluene diisocyanate, 2,6-toluene diisocyanate, or mixtures thereof, the diisocyanates of choice. Additional diisocyanates which may be used are 4,4'-diphenyl diisocyanate, 4,4'-diphenylene methane diisocyanate, 4,4'-tolidine diisocyanate, the naphthalene diisocyanates, and p-phenylene diisocyanate. The proper amount of the diisocyanate should be intimately blended with the polyester, preferably at room temperature, and the mixture then heated to a temperature in the range of about 100°–150° C. to accomplish incipient gelation.

The precise amount of diisocyanate to be added to a given amount of polyester will vary slightly according to the particular polyester involved, even where identical ingredients are used under purportedly identical conditions. One of the great deterrents to the wide use of diisocyanate-modified polyesters has been the inability to obtain reproducible results where polyesters have been made from identical ingredients under apparently identical conditions and have then been reacted with identical amounts of identical diisocyanates. For this reason, it is essential that each batch of polyester be tested to determine the exact amount of diisocyanate needed for that particular batch of polyester if the polyester is to serve as a useful component in the binder system of the present invention. The addition of too little diisocyanate will yield a binder system and a surface covering material fabricated therefrom which is too soft, flexible, and which possesses too low abrasion resistance to serve as a useful surface covering material. On the other hand, an excess of diisocyanate yields a polyester with dangling free isocyanate groups. Such a polyester is water-reactive, and may be sufficiently cross-linked to yield a tough, stiff and unprocessible binder system completely unsuitable for surface covering materials.

The precise amount of diisocyanate to be added to the polyesters described herein should be that amount needed to give an incipient gel, and no more. It is a fortuitous happenstance that the point of incipient gelation with the particular polyesters described herein yields a diisocyanate-modified polyester of maximum chain length and minimum cross-linking, which polyester is pre-eminently suitable for the binder systems and surface covering materials of the present invention. For any given polyester, this precise amount of diisocyanate may readily be determined by one or the other of two methods.

The first method amounts to an empirical determination. A number of samples of the polyester are withdrawn at the end of the polyester-forming process. To each of the samples after weighing is added a weighed amount of diisocyanate, the amount being different for each sample. The samples are then heated, for example to a temperature in the range of about 100°–150° C., to accomplish incipient gelation and are then cooled. The sample containing the proper amount of diisocyanate will be that sample which neither flows easily nor sets to a stiff gel. The amount of diisocyanate which will yield a chain-extended polyester wherein an air bubble will either just rise or just not rise will yield the chain-extended polymer which can be used as a component in the binder system for surface covering materials. This amounts to no more than saying that the proper amount of diisocyanate is that amount which yields an incipient gel on one or more samples pulled for that purpose. The point of incipient gelation defines the point where chain extension of the polyester is at an optimum and cross-linking has just begun to occur. Generally speaking, the proper amount of diisocyanate will be that amount by weight equal to 0.6–0.9 isocyanate equivalent for each polyester equivalent; amounts more accurately stated than this simply cannot be given in view of the present state of knowledge concerning diisocyanate-modified polyesters.

The second method of determining the precise amount of diisocyanate to be added to a given polyester involves more elaborate analytical technics. This method is particularly useful where the procedures for making a particular polyester have not been completely developed, and the characteristics of the resulting polyester are not completely understood. The method involves the separation of a sample of the bulk polyester into one or more polyester species by chromotographic methods or by a water-wash method. The individual polyester species are then characterized as to weight fraction, hydroxyl number, acid number, and the like. The end groups of the polyester chain and their equivalent weights are thus determined. Using weighted averages according to the characteristics of the various polyester species, it is then possible to determine the precise amount of diisocyanate to be added to a given weight of the bulk polyester to yield an incipient gel at which chain extension is at an optimum and cross-linking has just begun to occur. This second method is set forth more fully in copending application Serial No. 536,737, filed September 26, 1955.

Once the proper amount of diisocyanate has been thoroughly and intimately dispersed throughout the polyester, the mixture is heated to an elevated temperature to achieve gelation as described above. Subsequently, the diisocyanate-modified polyester may be cooled and utilized with a polymerized vinyl halide to form the binder system of the present invention.

The polymerized vinyl resins to be used in the binder system of the present invention may be those low to medium molecular weight polymerized vinyl halides available in commerce. Exemplary of such resins are those polyvinyl resins made by the Bakelite Company and bearing the designations "VYMF," "VYVF" (copolymer of vinyl chloride containing about 3%–5% vinyl acetate), "VYNW," "VYHH" (vinyl chloride copolymer containing about 13% vinyl acetate), and mixtures thereof. Additionally, the "Geon" resins sold by the B. F. Goodrich Chemical Company, in particular those designated as "Geon 121" and "Geon 126," are suitable. The most significant property of the polymerized vinyl halide resin suitable for use in the binder system of the present invention is that of yielding a hard, tough, and otherwise suitable surface covering material after being plasticized with the sulfurcurable diisocyanate-modified polyesters described above, and thereafter admixed with suitable fillers and other ingredients to be described later and formed into a surface covering material.

The delayed action isocyanate is an aromatic diisocyanate containing at least one alkyl group ortho to each isocyanate group on the ring. Exemplary of such compounds are the following:

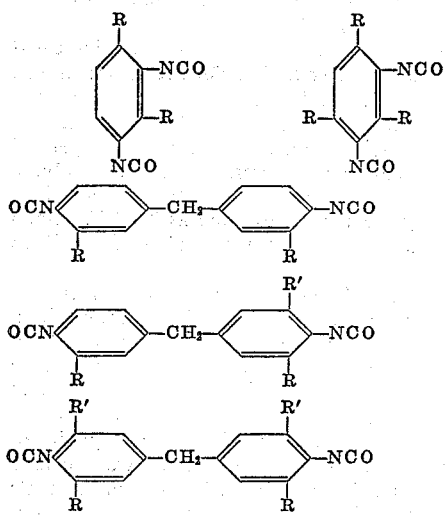
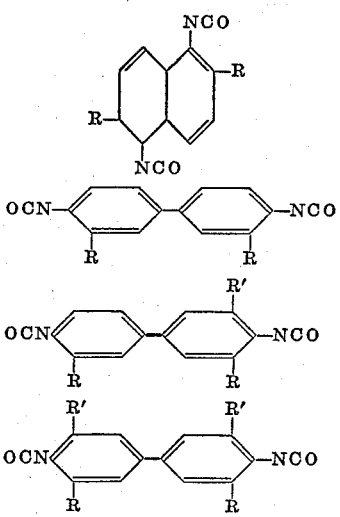

where R is an alkyl group containing 1 to 18 carbon atoms, but is preferably methyl, and R' is hydrogen or an alkyl group containing 1 to 18 carbon atoms, but preferably hydrogen.

When such aromatic diisocyanates are incorporated into the composition of the present invention, no reaction occurs as long as the temperature of the composition is maintained below about 190° F. The reactivity of these aromatic diisocyanates becomes triggered only at temperatures above about 190° F., and preferably in the range of 210°–250° F. The presence of the alkyl groups ortho to the isocyanate groups on the molecule brings about a much reduced reactivity of the molecule. Stearic effects may also play a role. In any case, the use of these aromatic diisocyanates in a composition of the present invention enables one to have present a vigorous cross-linking agent for the diisocyanate-modified polyester described earlier. Yet the activity of the cross-linking agent is delayed until such activity becomes desirable. The cross-linking reaction mechanism involving the aromatic diisocyanate is triggered simply by elevating the temperature of the composition containing those diisocyanates to the desired range.

The amount of the aromatic diisocyanate to be used will depend on the amount of diisocyanate-modified polyester to be cross-linked. The diisocyanate-modified polyester serves as a plasticizer for the polymerized vinyl halide, and the desired degree of plasticity will be achieved by selection of the proper amount of the diisocyanate-modified polyester in relation to the amount of polymerized vinyl halide. Therefore, the amount of aromatic diisocyanate to serve as a delayed-action cross-linking agent will be keyed to the amount of modified polyester plus polymerized vinyl halide. It is convenient to place the amount on a parts by weight aromatic diisocyanate per 100 parts by weight modified polyester-polymerized vinyl resin binder system.

As mentioned earlier, the amount of aromatic diisocyanate having an alkyl group ortho to each isocyanate group should be in the range of about 0.38 to 4 parts per 100 parts by weight of the diisocyanate-modified polyester-polymerized vinyl resin system, conveniently referred to as the binder system. A smaller amount than the minimum listed above does not yield any particularly advantageous result from the triggering mechanism. A larger amount, on the other hand, causes excess cross-linking and tightens the network to the extent that the composition is unusable for the purposes here designed. Although good results are obtained using those amounts stated within the broad limits, it is preferred to use about 2 parts by weight of the aromatic diisocyanate per 100 parts by weight of the binder system.

To prepare the composition, the binder system is admixed with filler including pigment in suitable proportions. When the filler content is below about 15%, pattern control may be difficult where the composition is used for a surface covering. When more than about 75% by weight of filler is present, the physical properties of a finished surface covering material do not measure up to the desired standards, particularly in the floor covering art. Particularly advantageous results have been obtained when a filler includes a preponderant proportion by volume of fibrous filler, such as wood flour, cork particles, asbestos, mineral fibers, and the like. The remainder of the filler component is comprised of finely divided particles such as whiting, clay, silica, slate flour, and similar fibrous filler material. All these substances and mixtures thereof are contemplated when the term "filler" is used herein. Also included in the filler component are small but effective amounts of lubricants and detackifying agents such as, for example, stearic acid, paraffin wax, ceresin wax, oleic acid, lauric acid, and dibutyl ammonium oleate.

Many of the advantages of the present invention result from the fact that the diisocyanate-modified polyester used therein is sulfurcurable. Thus, vulcanizing agents and curing accelerators may also be added to the filled composition. There may be added sulfur or sulfur-containing compounds, along with various vulcanization accelerators, as for example, zinc phenyl ethyl dithiocarbamate, zinc isopropyl dithiocarbamate, zinc diethyl dithiocarbamate, zinc phenyl ethyl dithiocarbamate, diphenyl guanadine, tetraethyl thiuram disulfide, and tetramethyl thiuram disulfide. Plasticizers such as tricresyl phosphate, dibutyl phthalate, m-alkyl toluene sulfonamide, and other known plasticizers may be added. Stabilizers or antioxidants such as hydroquinone, n-phenyl alpha naphthalamine, n-phenyl beta naphthalamine, n,n'-exomethylene-bis-orthohydroxy benzamide, sodium acid phosphate, dibutyl tin laurate, and others known in the art may be used. The total amount of the compounding agents exclusive of the fibrous and nonfibrous filler generally runs up to about 10% by weight of the filler.

The preferred embodiment of the present invention is to include the listed amounts of aromatic diisocyanate as a delayed-action cross-linking agent along with amounts of sulfur less than that normally required. The binder-filler system could be cured with sulfur alone. However, such a cure, as mentioned earlier, generally takes a sufficiently long time at practical temperatures that undue stove staining may sometimes occur. The use of the aromatic diisocyanate in conjunction with the sulfur materially shortens the time required for cure and thus reduces stove staining.

An unexpected advantage results from the use of the delayed-action aromatic diisocyanate. The delayed-action diisocyanate apparently acts in much the same manner as sulfur, that is, it is a cross-linking agent. However, there is greater space across the aromatic ring cross-linking structure than across the sulfur cross-linking structure. The result is that the cross-linked modified polyester is a better plasticizer for the polymerized vinyl halide resin when the cross-linking has been accomplished with the aromatic diisocyanate than it is when the cross-linking has been accomplished with sulfur. By using both the aromatic diisocyanate and the sulfur, degrees of plasticity in between the two extremes may be achieved and controlled. Although the present invention contemplates cross-linking the diisocyanate-modified polyester solely with the aromatic diisocyanate, it is a preferred embodiment to cross-link with both the aromatic diisocyanate and sulfur.

As can be seen from the above, the compositions comprise filler, aromatic diisocyanate, and a binder system containing polymerized vinyl halide, preferably polyvinyl chloride, and a diisocyanate-modified polyester. It is also possible to utilize a composition which contains other ingredients besides the basic binder components. For example, vinyl chloride-vinyl acetate copolymer may be incorporated into the binder, as well as synthetic rubbers such as butadiene-styrene copolymers, butadiene-acrylonitrile copolymers, chloroprene polymers, and the like. Additionally, a portion of the binder may be replaced by additional and different polyesters.

In producing the composition to be calendered into a sheet, the ingredients are weighed and mixed in an intensive mixer such as a Banbury. In view of the fact that the composition contains an aromatic diisocyanate triggered to become reactive at above about 190° F., it becomes important that the temperature of the composition in the Banbury be limited to a temperature in the range of about 190°–205° F. At the upper end of this range, a slight amount of cross-linking may taken place, but generally such is not objectionable so long as it is not too extensive. The mixture resulting from the Banbury may then be subjected to further mixing on a mill, again being cautious about the temperature, followed by cooling of the mix. The slab from the mill may then be subdivided to the desired particle sizes and the resulting mixture of finely divided particles may be passed through a calender in an operation to be described more fully below.

In the preferred embodiment of the plastic surface covering preparation, the loose mass of particles, which is subjected to the operations of the calender, is such that the preponderant proportion is in the range of about 8 mesh to dust. Particles of such size may be calendered without danger of blisters forming on the face of the sheet. It is particularly advantageous to have at least about 60% of the particles in the mass to be calendered in the range of about 8 mesh to dust. Depending on the pattern desired, granules or chips or strips and the like may be used. The completed formulation may be calendered into a sheet, which may be applied to a backing at the same or a subsequent stage of the process. The backing material may be any of a number of materials employed in the production of resilient surface covering material. For example, it may be burlap or asbestos or a saturated felt such as an asphalt-saturated felt, a resin-saturated felt, or a felt which has been coated with rubber or synthetic rubber, as by the beater saturation process. Thus, the fabric backing will include such materials as woven fabric, for example burlap, canvas, or cotton sheeting, and felted products such as asbestos or saturated felt.

The composition obtained as indicated above is calendered into a sheet by passing the material through a calender, in which the face roll is generally but not always at a lower temperature than the back roll. The temperature of the roll varies, depending upon the desired pattern. For example, to obtain plain or striated effects, the face roll temperature should be in the range of about 80°–150° F. Generally speaking, the temperature of the back roll is advantageously maintained at a temperature of about 80°–220° F.

Following the production of the sheet as indicated above, the material is then cured at elevated temperatures. The cure may be accomplished in curing presses, but particularly advantageous results have been obtained by suspending the material in air and heating the suspended material at elevated temperatures. In order to obtain maximum physical properties, it is advantageous to utilize comparatively high temperatures, such as 250° F. Good cures can be obtained in the range of about 210° F. to about 275° F.

The time of cure will be dependent on the temperature of cure. In every case, however, with the composition of the present invention containing an aromatic diisocyanate having an alkyl group ortho to the isocyanate groups, the cure time will be substantially less than that obtained without the aromatic diisocyanate; this is true no matter what the quantity of sulfur or the quality of the curing accelerators where these latter two are used alone. Excellent results are obtained in the curing cycle generally by curing the sheet in stoves at temperatures of about 220°–250° F. for a period of time of about 8 to about 30 hours. The temperature should be raised gradually to prevent formation of blisters due to sudden exposure to heat. If desired, the final product may be given a high gloss by the application of lacquer and/or wax after the curing operation.

The compositions of the present invention are particularly well suited to surface coverings such as floor coverings, wall coverings, desk tops, counter tops, sink tops, table tops, and the like, in the form of sheet goods or tile.

The following examples illustrate several embodiments of the invention. All parts are by weight unless otherwise stated.

*Example I*

To a three-liter, three-neck flask fitted with sealed stirrer, an electrically heated reflux condenser attached to a water-cooled take-off condenser, an inlet for the admission of carbon dioxide, a thermal regulator, and a thermometer was added 643 parts (7.14 moles, 19% excess) 1,4-butanediol. The dried carbon dioxide flow rate was kept at 0.3 liter per minute, and the temperature of the 1,4-butanediol was increased to 80° C. To the heated 1,4-butanediol was added 304.3 parts (2 moles) tetrahydrophthalic anhydride. The anhydride was added slowly to the reaction mixture so there would not be a sharp decrease in temperature. Mixing was continued until a homogeneous solution was obtained, and then 584.8 parts (4 moles) adipic acid was added slowly to the hot stirred mixture. After all the adipic acid was added, the temperature was increased to 145° C. over a period of 30 minutes and held at that temperature for 1 hour. The gas flow was kept at 0.3 liter per minute, and at a temperature of 145° C. some water started to distill off. The temperature was then raised to 200° C. over a period of 90 minutes and maintained at that temperature until an acid number of 30±2 was obtained. The time required to reach that acid number was approximately 400 minutes. When an acid number of 30 was obtained, the temperature of the mixture was raised to 230° C. over a period of 60 minutes and the flow of carbon dioxide was increased to 2.5 liters per minute. The temperature was maintained at 230° C. for 200 minutes, after which the temperature was increased to 245° C. over a 60-minute period and the gas flow was increased to 3.5 liters per minute. The batch temperature was maintained at 245° C. until an acid number of 3–6 was obtained. The final hydroxyl number was 27. The polyester was then cooled.

Into a kettle equipped with an agitator was placed 2500 parts of the above polyester and the charge was heated to 260° F. (127° C.) with agitation. At that temperature, 110.2 parts 2,4-toluene diisocyanate was added and the mixture was maintained at 260° F. with agitation for 30 minutes. This amount of diisocyanate was determined to be proper by withdrawing several samples of the bulk polyester and adding increasing amounts of the diisocyanate to each of the samples. After thorough mixing, the samples were gelled by being heated to 200° F. (104° C.) for 12 hours. The weight of the diisocyanate needed for the 2500 parts of polyester was calculated from that sample which just reached the point of incipient gelation.

At the end of the 30-minute period of agitation of the 2500 parts of polyester, plus the diisocyanate, the mixture was a thick, viscous liquid which was poured from the kettle into a greased pan and allowed to cool. The gelling reaction was completed by placing the polyester in the greased pan in an oven heated at 220° F. for a period of 12 hours. At the end of that time, the modified polyester was a thick, viscous gum.

A blend utilizing the above-described modified polyester was then formulated into a resilient flooring composition in accordance with the following formula:

| | Parts |
|---|---|
| Diisocyanate-modified polyester | 265 |
| Geon 126 (polyvinyl chloride resin) | 265 |
| TCP (tricresyl phosphate) | 47 |
| Whiting (ground limestone) | 353 |
| International fiber (mineral filler) | 180 |
| Wood flour | 132 |
| Stearic acid | 4 |
| Ceresin wax | 8 |
| Sodium monoacid phosphate on clay filler | 6 |
| Mercaptobenzothiazole | 8 |
| Cupric dimethyldithiocarbamate | 0.4 |
| Alkyl phenoldisulfide | 8 |
| Zinc oxide | 16 |
| Titanium dioxide | 100 |

A series of batches prepared as above was mixed with varying amounts of sulfur and bitolyl diisocyanate. Each composition was Banbury mixed, sheeted out, and cured at 220° F. for 7 hours. The following table illustrates the results:

| Run | Parts Bitolyl Diisocyanate | Parts Sulfur | Tensile Strength, Lbs./Sq. Inch | Elongation, percent |
|---|---|---|---|---|
| Control | 0 | 1 | 675 | 29.6 |
| 1 | 5 | ½ | 958 | 24.2 |
| 2 | 10 | ½ | 976 | 29.2 |
| 3 | 2 | 1 | 887 | 24.2 |
| 4 | 5 | 1 | 993 | 32.8 |
| 5 | 10 | 1 | 1,052 | 31.1 |

*Example II*

To a five-liter, four-neck flask equipped as described in Example I was added 1928 parts (21.4 moles, 19% mole excess), 1,4-butanediol and 588 parts (6 moles) maleic anhydride. The mixture was heated, and after about 20 minutes, the maleic anhydride was in solution, and 1754 parts (12 moles) adipic acid was added. The gas flow was maintained at 0.4 liter carbon dioxide per minute. After the adipic acid was added, the temperature of the mixture was increased to 140° C. over a period of 45 minutes and held at this temperature for 120 minutes. Over a period of 225 minutes, the temperature of the polyester was increased to 200° C. and was maintained at 200° C. for 620 minutes. After an acid number of 15 was obtained, the temperature was increased to 215° C. over a period of 15 minutes and was held at that temperature for the remainder of the reaction cycle. The total reaction time for the preparation of this polyester was 1100 minutes, and the final acid number and hydroxyl number were 12 and 23, respectively.

500 parts of this polyester was converted to an incipient gel by the addition of 2,4-toluene diisocyanate in accordance with Example I; 18 parts of the diisocyanate was required.

150 parts of the above-described modified polyester was intimately blended with 100 parts of the polyvinyl chloride resin designated as "VYHH" and 4 parts of 4,4'-methylene-o-tolyl isocyanate.

A resilient surface covering material fabricated from the above-described blend in accordance with usual processes produced a tough excellent surface covering material.

We claim:

1. A composition of matter comprising (1) about 85%–25% by weight of an intimately blended mixture comprising about 30%–75% by weight diisocyanate-modified polyester and about 70%–25% by weight polymerized vinyl halide, (2) about 15%–75% by weight filler, and (3) about 0.38 to about 4 parts by weight of aromatic diisocyanate having an alkyl group ortho to each isocyanate group per each 100 parts by weight of said mixture, said diisocyanate-modified polyester being the reaction product of just sufficient organic diisocyanate with unmodified polyester to form an incipient gel, said unmodified polyester having an acid number in the range of about 2–15 and a hydroxyl number in the range of about 20–55 and being formed from a saturated glycol having 4 carbon atoms, a saturated dibasic acid having 6–10 carbon atoms, and a dibasic acid possessing a single unsaturated bond and no more than 8 carbon atoms, said saturated acid and said unsaturated acid being present in a mole ratio of about 2:1.

2. The composition of claim 1 which has been cured by the application of heat thereto.

3. A composition according to claim 1 wherein said acid number is in the range of about 4–6 and said hydroxyl number is in the range of about 30–40.

4. A composition according to claim 1 wherein said intimately blended mixture comprises about 50% by weight of said diisocyanate-modified polyester and about 50% by weight of said polymerized vinyl halide.

5. A composition according to claim 1 wherein said glycol comprises 1,4-butanediol, said saturated dibasic acid comprises adipic acid, and said dibasic acid possessing a single unsaturated bond comprises tetrahydrophthalic anhydride.

6. The composition of claim 5 which has been cured by the application of heat thereto.

7. A composition according to claim 5 wherein said polymerized vinyl halide comprises polyvinyl chloride.

8. A composition according to claim 1 wherein said aromatic diisocyanate having an alkyl group ortho to each isocyanate group comprises bitolyl diisocyanate.

9. A composition according to claim 1 wherein said aromatic diisocyanate having an alkyl group ortho to each isocyanate group comprises 4,4'-methylene-o-tolyl diisocyanate.

References Cited in the file of this patent

UNITED STATES PATENTS

| 2,606,162 | Coffey et al. | Aug. 5, 1952 |
| 2,625,531 | Seeger | Jan. 13, 1953 |